US008929649B2

(12) United States Patent
Teshima (10) Patent No.: US 8,929,649 B2
(45) Date of Patent: Jan. 6, 2015

(54) IMAGE PROCESSING APPARATUS FOR CONVERTING IMAGE IN CHARACTERISTIC REGION OF ORIGINAL IMAGE INTO IMAGE OF BRUSHSTROKE PATTERNS

(75) Inventor: Yoshihiro Teshima, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 149 days.

(21) Appl. No.: 13/557,675

(22) Filed: Jul. 25, 2012

(65) Prior Publication Data

US 2013/0028471 A1 Jan. 31, 2013

(30) Foreign Application Priority Data

Jul. 26, 2011 (JP) ................................. 2011-163413

(51) Int. Cl.
*G06K 9/00* (2006.01)
*G06T 11/20* (2006.01)
*G06T 11/00* (2006.01)
*G09G 5/02* (2006.01)

(52) U.S. Cl.
CPC .................................. *G06T 11/001* (2013.01)
USPC ............ 382/167; 345/441; 345/467; 345/589

(58) Field of Classification Search
CPC ........... G06T 2207/20104; G06T 2207/20192; G06T 2207/20144; G06T 11/001; G06T 11/60; G06T 7/0083; G06T 7/0085; G06T 5/00; G03G 2215/00063
USPC ................... 382/167; 345/419, 441, 589, 467
See application file for complete search history.

(56) References Cited

U.S. PATENT DOCUMENTS

| 5,611,036 A * | 3/1997 | Berend et al. ................. 345/441 |
| 7,327,364 B2 | 2/2008 | Ohba et al. |
| 2004/0056858 A1 * | 3/2004 | Ohba et al. .................... 345/419 |
| 2010/0053193 A1 * | 3/2010 | Nagamatsu et al. .......... 345/589 |

FOREIGN PATENT DOCUMENTS

| JP | 2004110598 A | 4/2004 |
| JP | 2006-114024 A | 4/2006 |
| JP | 2007316911 A | 12/2007 |
| JP | 2009134762 A | 6/2009 |

OTHER PUBLICATIONS

Japanese Office Action dated Sep. 30, 2014, issued in counterpart Japanese Application No. 2011-163413.
Maekawa, et al., "Generation of Ink Painting Image from Two-Dimensional Image", Proceedings (4) of the 72nd National Convention of IPSJ, Mar. 8, 2010, 4-339-4-340.

* cited by examiner

*Primary Examiner* — Amir Alavi
*Assistant Examiner* — Kenny Cese
(74) *Attorney, Agent, or Firm* — Holtz, Holtz, Goodman & Chick PC

(57) ABSTRACT

The importance detection unit 52 detects importance of each pixel composing the original image thus acquired. In addition, the importance map generation unit 52 generates an importance map indicating distribution of the importance detected for each pixel. The characteristic region detection unit 61 detects a characteristic region of the original image, from the original image thus acquired. The determination unit 62 determines a brushstroke pattern that should be applied to the characteristic region thus detected, from at least two types of brushstroke patterns stored in a storage unit. The brushstroke pattern conversion unit 63 converts an image in the characteristic region into an image, to which the brushstroke pattern is applied, based on the brushstroke pattern thus determined. The adjustment unit 64 adjusts color of the image of the brushstroke pattern being the image in the characteristic region, based on the importance map thus generated.

8 Claims, 5 Drawing Sheets

IMAGE PROCESSING APPARATUS FOR CONVERTING IMAGE IN CHARACTERISTIC REGION OF ORIGINAL IMAGE INTO IMAGE OF BRUSHSTROKE PATTERNS

This application is based on and claims the benefit of priority from Japanese Patent Application No. 2011-163413, respectively filed on 26 Jul. 2011, the content of which is incorporated herein by reference.

BACKGROUND OF THE INVENTION

1. Field of the Invention

The present invention relates to an image processing apparatus and an image processing method as well as a storage medium.

2. Related Art

In recent years, image processing is executed on data of an original image to improve artistry for the purpose of enhancing the rendering effects.

For example, in order to accomplish the aforementioned purpose, Japanese Unexamined Patent Application, Publication No. 2006-114024 discloses image processing, in which an edge is detected in data of an original image that includes a person's face as a subject, thereby converting the data of the original image into data of an image that is similar to an ink-wash painting (suiboku-ga) (hereinafter referred to as an "ink-wash-painting-like image") that is a type of an image with high artistry.

SUMMARY OF THE INVENTION

The object of the present invention is to obtain an image that is more similar to a real painting.

In order to achieve the above object, an image processing apparatus according to an aspect of the present invention includes: an image processing apparatus according to an aspect of the present invention includes: an acquisition unit that acquires an original image; an importance detection unit that detects importance of each pixel composing the original image acquired by the acquisition unit; an importance map generation unit that generates an importance map indicating distribution of the importance detected for each pixel by the importance detection unit; a characteristic region detection unit that detects a characteristic region in the original image, from the original image acquired by the acquisition unit; a determination unit that determines a brushstroke pattern that should be applied to the characteristic region detected by the characteristic region detection unit, from at least two types of brushstroke patterns stored in a storage unit; a conversion unit that converts an image in the characteristic region into an image, to which the brushstroke pattern is applied, based on the brushstroke pattern determined by the determination unit; and an adjustment unit that adjusts color of the image of the brushstroke pattern being the image in the characteristic region, based on the importance map generated by the importance map generation unit.

In addition, in order to achieve the above object, an image processing method for an image processing apparatus to execute image processing on an original image, the method includes: an acquiring step of acquiring the original image; an importance detecting step of detecting importance of each pixel composing the original image acquired in the acquiring step; an importance map generating step of generating an importance map indicating distribution of the importance detected for each pixel in the importance detecting step; a detecting step of detecting a characteristic region of the original image; a determining step of determining a brushstroke pattern that should be applied to the characteristic region detected by processing in the characteristic region detecting step, from at least two types of brushstroke patterns stored in a storage unit; a converting step of converting data of the original image in the characteristic region, based on data of the brushstroke pattern determined by processing in the determining step; and an adjusting step of adjusting color of the image of the brushstroke pattern being the image in the characteristic region, based on the importance map generated in the importance map generating step.

In addition, in order to achieve the above object, a computer readable storage medium records a program for controlling image processing of an original image, the program causing a computer to function as: an acquisition unit that acquires the original image; an importance detection unit that detects importance of each pixel composing the original image acquired by the acquisition unit; an importance map generation unit that generates an importance map indicating distribution of the importance detected for each pixel by the importance detection unit; a characteristic region detection unit that detects a characteristic region of the original image, from the original image acquired by the acquisition unit; a determination unit that determines a brushstroke pattern that should be applied to the characteristic region detected by the characteristic region detection unit, from at least two types of brushstroke patterns stored in a storage unit; a conversion unit that converts an image in the characteristic region into an image, to which the brushstroke pattern is applied, based on the brushstroke pattern determined by the determination unit; and an adjustment unit that adjusts color of the image of the brushstroke pattern being the image in the characteristic region, based on the importance map generated by the importance map generation unit.

DETAILED DESCRIPTION OF THE INVENTION

In the following, an embodiment of the present invention will be explained with reference to the drawings.

Figure 1:
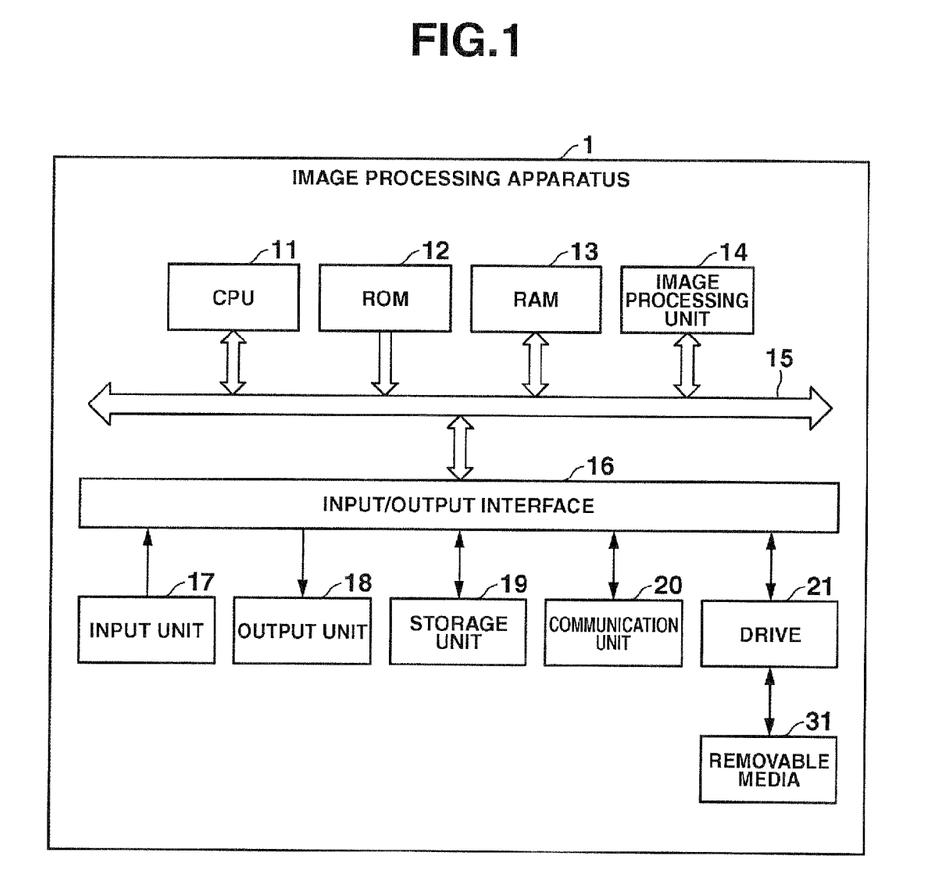
FIG. 1 is a block diagram showing a configuration of hardware of an image processing apparatus according to one preferred embodiment of the present invention.

FIG. 1 is a block diagram showing a configuration of hardware of an image processing apparatus according to one preferred embodiment of the present invention.

The image processing apparatus 1 is provided with a CPU (Central Processing Unit) 11, ROM (Read Only Memory) 12, RAM (Random Access Memory) 13, an image processing unit 14, a bus 15, an input/output interface 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The image processing unit 14 is configured by a DSP (Digital Signal Processor), VRAM (Video Random Access Memory) and the like, and collaborates with the CPU 11 to execute various image processing on image data.

The CPU 11, the ROM 12, the RAM 13, and the image processing unit 14 are connected to one another via the bus 15. The bus 15 is also connected with the input/output interface 16. The input/output interface 16 is connected to the input unit 17, the output unit 18, the storage unit 19, the communication unit 20, and the drive 21.

The input unit 17 is configured by a keyboard, a mouse and the like, and inputs various information in accordance with instruction operations by a user.

The output unit 18 is configured by a display, a speaker and the like, and outputs images and sound.

The storage unit 19 is configured by DRAM (Dynamic Random Access Memory) or the like, and stores data of various images.

The communication unit 20 controls communication with other devices (not shown) via a network, which includes the Internet.

Removable media 31 made of a magnetic disk, an optical disk, a magneto-optical disk, semiconductor memory or the like is installed in the drive 21, as appropriate. Programs that are read via the drive 21 from the removable media 31 are installed in the storage unit 19, as necessary. In addition, similarly to the storage unit 19, the removable media 31 can also store various data such as the image data stored in the storage unit 19.

Figure 2:
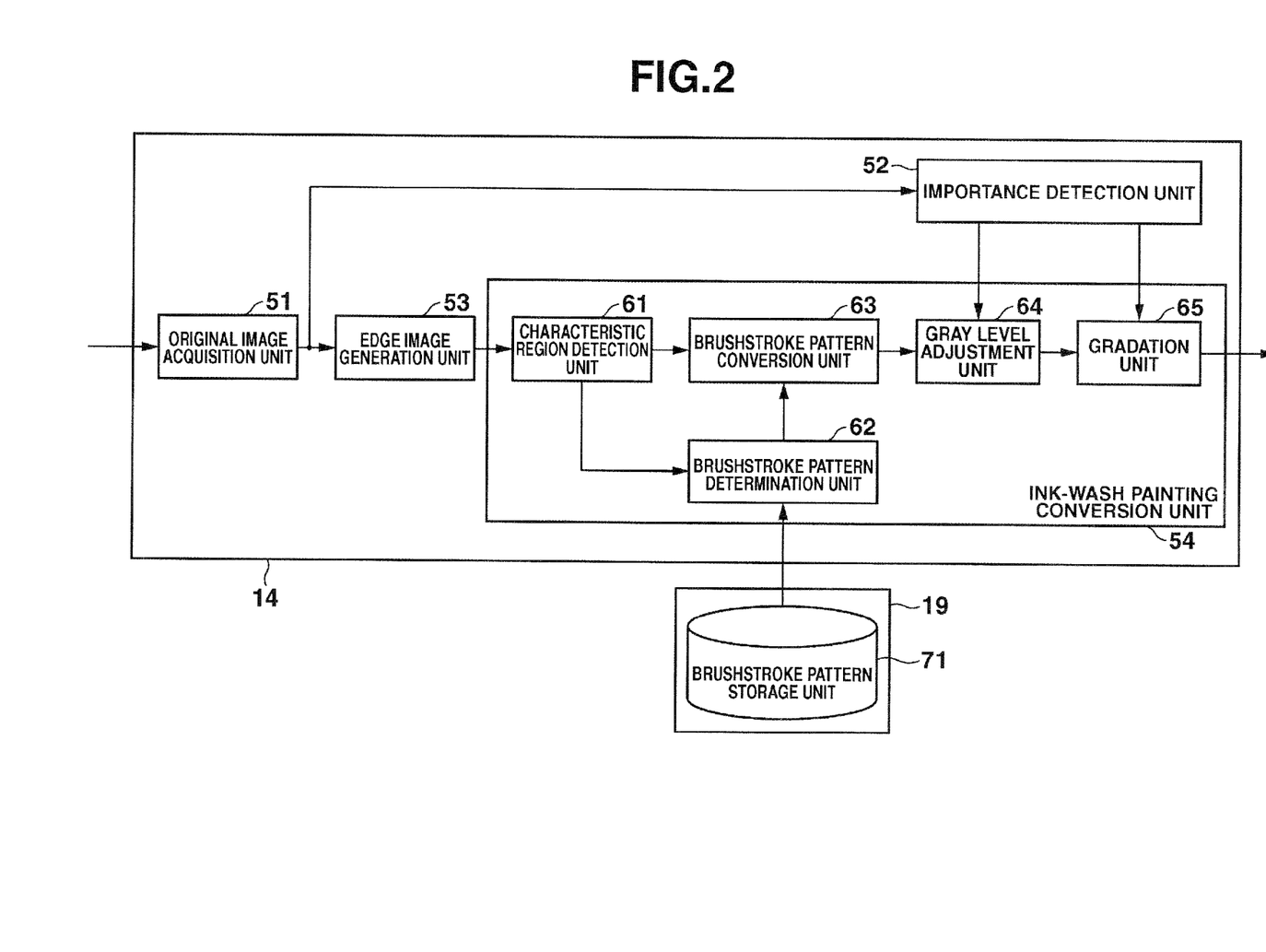
FIG. 2 is a functional block diagram showing a functional configuration for executing ink-wash-painting-like image generation processing, regarding the functional configuration of the image processing apparatus shown in FIG. 1.

FIG. 2 is a functional block diagram showing a functional configuration for executing ink-wash-painting-like image generation processing, in the functional configuration of such an image processing apparatus 1.

Here, the ink-wash-painting-like image generation processing refers to a series of processing for generating data of an ink-wash-painting-like image from data of an original image that is input as an object of image processing.

In a case in which the ink-wash-painting-like image generation processing is executed according to control by the CPU 11, an original image acquisition unit 51, an importance detection unit 52, an edge image generation unit 53, and an ink-wash painting conversion unit 54 function in the image processing unit 14.

Moreover, a brushstroke pattern storage unit 71 is provided as an area of the storage unit 19.

The original image acquisition unit 51 acquires data of an image transmitted from another device and received by the communication unit 20, data of an image that is read from the removable media 31 via the drive 21 and the like as data of the original image, and supplies such data to the importance detection unit 52 and the edge image generation unit 53.

The importance detection unit 52 detects importance of each pixel composing an original image by using a color, brightness, an edge direction or the like as an indicator of importance, and generates an importance map indicating spatial distribution of the importance detected for each pixel. The importance map thus generated by the importance detection unit 52 is supplied to the ink-wash painting conversion unit 54.

The edge image generation unit 53 executes edge detection processing on data of the original image, and generates data of a binary image in which, for example, the detected edge is black, and the other portions are white (such a binary image is hereinafter referred to as an "edge image"). The data of the edge image thus generated by the edge image generation unit 53 is supplied to the ink-wash painting conversion unit 54.

The ink-wash painting conversion unit 54 executes processing for converting the data of the edge image into data of an ink-wash-painting-like image. Such processing is hereinafter referred to as "ink-wash painting conversion processing".

Image processing is employed as the ink-wash painting conversion processing in the present embodiment, in which a texture that imitates handwriting of a writing brush for calligraphy is applied to an original image. Such a pattern of the "texture that imitates handwriting of a writing brush for calligraphy" is referred to as a "brushstroke pattern" in the present specification.

A shape, a size and the like of the texture employed as the brushstroke pattern are not limited in particular. However, two types of brushstroke patterns shown in FIG. 3 are employed in the present embodiment.

FIG. 3 is a diagram showing examples of the brushstroke patterns.

Figure 3A:
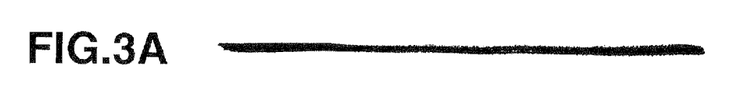
FIG. 3 is a diagram showing examples of brushstroke patterns.

FIG. 3A shows a brushstroke pattern that imitates handwriting in a case of using a portion "the longest hair on the tip" of the writing brush (an extreme tip portion of the writing brush). It should be noted that the brushstroke pattern as shown in FIG. 3A is hereinafter referred to as an "upright-brush brushstroke pattern".

Figure 3B:
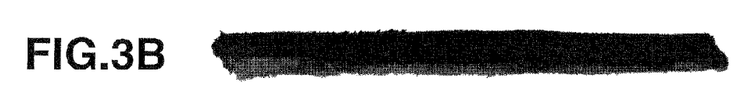

FIG. 3B shows a brushstroke pattern that imitates handwriting in a case of using a lateral portion (a part of the "head") of the writing brush ranging from a "neck (portion adjacent to the extreme tip)" to a "ventral (middle portion)" thereof. It should be noted that the brushstroke pattern as shown in the FIG. 3B is hereinafter referred to as an "oblique-brush brushstroke pattern".

As would be easily understood by comparing FIGS. 3A and 3B, the upright-brush brushstroke pattern is characterized in that a length in a direction orthogonal to a longitudinal direction (hereinafter referred to as a "width") is narrow, as a result of which the variation in the gray levels(the depth of color) is small. In contrast, the oblique-brush brushstroke pattern is characterized in that the width is wide, as a result of which the variation in the gray levels is large.

In the present embodiment, each data of the upright-brush brushstroke pattern and the oblique-brush brushstroke pattern as described above is stored in the brushstroke pattern storage unit 71.

It should be noted that a technique for generating data of the brushstroke patterns is not limited in particular, and for example, a technique for generating data by using CG (Computer Graphics) may be employed. However, the present embodiment employs a technique, in which handwriting actually written on a paper medium with a writing brush soaked in ink (Japanese Sumi) is captured with a scanner or a digital camera to create data of brushstroke patterns.

The ink-wash painting conversion unit 54 executes ink-wash painting conversion processing, in which data of an edge image is a processing object, the upright-brush brushstroke pattern is applied to an edge region, the oblique-brush brushstroke pattern is applied to a surrounding region of the edge region, and in a case in which the edge region forms a closed region, the oblique-brush brushstroke pattern is applied to an inside of the closed region.

Figure 4:
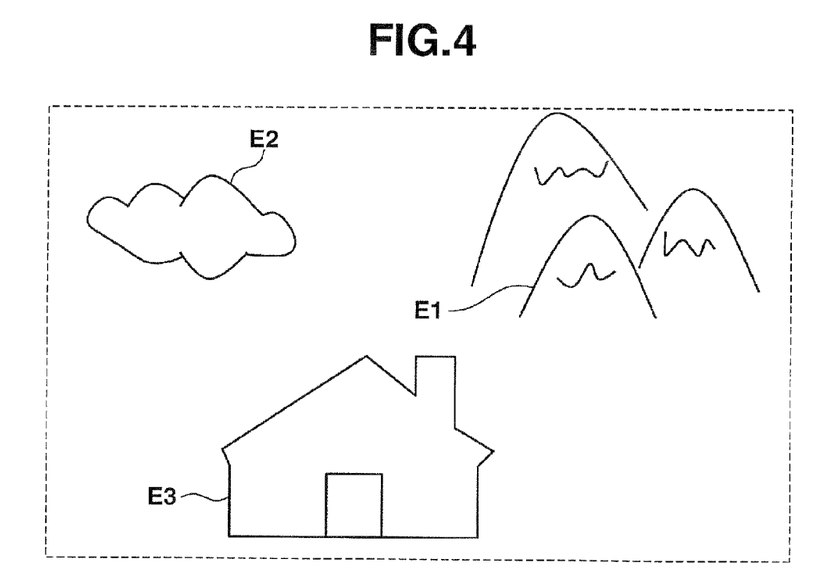
FIG. 4 is a diagram showing examples of edge images.
Figure 5:
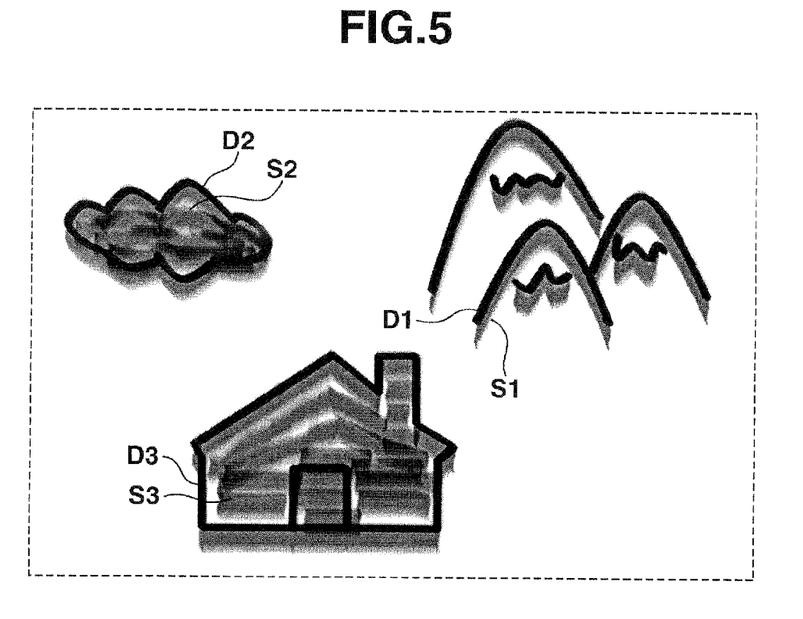
FIG. 5 a diagram showing examples of ink-wash-painting-like images that are converted from the edge images shown in FIG. 4.

More specifically, for example, the ink-wash painting conversion unit 54 executes the ink-wash painting conversion processing on data of an edge image as shown in FIG. 4, thereby generating data of an ink-wash-painting-like image as shown in FIG. 5.

FIG. 4 shows examples of edge images.

In FIG. 4, a black and narrow area is the edge region.

In FIG. 4, for example, an edge region E1 shows a contour of a mountain, an edge region E2 shows a contour of a cloud, and an edge region E3 shows a contour of a house.

FIG. 5 shows examples of ink-wash-painting-like images that are converted from the edge images in FIG. 4.

In FIG. 5, an upright-brush brushstroke pattern D1 is applied to the edge region E1 showing the contour of the mountain, and an oblique-brush brushstroke pattern S1 is applied to a surrounding region on the right side of the edge region E1.

Moreover, since the edge region E2 showing the contour of the cloud forms a closed region, an upright-brush brushstroke pattern D2 is applied to the edge region E2, and an oblique-brush brushstroke pattern S2 is applied so as to paint out an inside of the closed region.

Similarly, since the edge region E3 showing the contour of the house forms a closed region, an upright-brush brushstroke pattern D3 is applied to the edge region E3, and an oblique-brush brushstroke pattern S3 is applied so as to paint out an inside of the closed region.

More specifically, in order to execute the ink-wash painting conversion processing as described above, as shown in FIG. 2, the ink-wash painting conversion unit 54 of the present embodiment includes a characteristic region detection unit 61, a brushstroke pattern determination unit 62, a brushstroke pattern conversion unit 63, a gray level adjustment unit 64, and a gradation unit 65.

The characteristic region detection unit 61 detects a characteristic region for data of an edge image. Although the object detected as a characteristic region is an edge region in the present embodiment, it is not limited in particular.

Based on the characteristic region detected by the characteristic region detection unit 61, the brushstroke pattern determination unit 62 determines a brushstroke pattern to be used in the brushstroke pattern conversion unit 63, from each brushstroke pattern, each data of which is stored in the brushstroke pattern storage unit 71.

More specifically, in the present embodiment, the brushstroke pattern determination unit 62 determines an upright-brush brushstroke pattern as the brushstroke pattern to be used for the edge region that is the characteristic region. Moreover, the brushstroke pattern determination unit 62 determines an oblique-brush brushstroke pattern as the brushstroke pattern to be used for the surrounding region of the edge region that is the characteristic region, or for the region inside a closed curve of the edge region that forms the closed curve.

The brushstroke pattern conversion unit 63 converts the data of the edge image into data of an ink-wash-painting-like image by using data of the brushstroke pattern determined by the brushstroke pattern determination unit 62.

More specifically, the brushstroke pattern conversion unit 63 converts the data of the edge region into data of the upright-brush brushstroke pattern, such that the upright-brush brushstroke pattern is applied to the edge region. Similarly, the brushstroke pattern conversion unit 63 converts the data of the surrounding region of the edge region into data of the oblique-brush brushstroke pattern, such that the oblique-brush brushstroke pattern is applied to the surrounding region of the edge region. Moreover, in a case in which the edge region forms a closed region, the brushstroke pattern conversion unit 63 converts data of the inside of the closed region into data of the oblique-brush brushstroke pattern, such that the oblique-brush brushstroke pattern is applied so as to paint out the inside of the closed region.

Based on the importance map generated by the importance detection unit 52, the gray level adjustment unit 64 adjusts each color of the brushstroke pattern used in the brushstroke pattern conversion unit 63, i.e. adjusts the gray levels of the ink.

More specifically, as described above, the importance map shows the spatial distribution of the importance for each pixel. On the other hand, the gray levels are determined for each brushstroke pattern occupying a region consisting of a plurality of pixel groups.

Accordingly, the gray level adjustment unit 64 extracts, from the importance map, each importance of the plurality of pixel groups included in the region occupying the brushstroke pattern of an adjustment object, and calculates integrated importance of the entire region, based on a plurality of pieces of importance thus extracted.

It should be noted that a technique for calculating integrated importance of the entire region is not limited in particular as long as importance of a plurality of pixels composing the region is used, and for example, a technique for calculating a root mean square and a mean value can be employed. However, in order to easily calculate importance with a small number of calculations in short time, a technique for calculating a simple average of importance of a plurality of pixels is employed in the present embodiment.

The gray level adjustment unit 64 adjusts the gray levels, such that the brushstroke pattern occupying the region is darker (verges on black) as the integrated importance of the entire region is increased. Conversely, the gray level adjustment unit 64 adjusts the gray levels, such that the brushstroke pattern occupying the region is lighter (verges on white) as the integrated importance of the entire region is decreased.

In order to express a blur of the ink, the gradation unit 65 executes image processing for providing gradation from the region of the processing object to its perimeter, in which each data of the region that was converted into (applied as) a brushstroke pattern by the brushstroke pattern conversion unit 63 is a processing object (this image processing is hereinafter referred to as "gradation processing").

The amount (width) of gradation in the gradation processing is determined depending on the gray levels in the region of the processing object. More specifically, since the gray levels in the region of the processing object are adjusted based on the importance map as described above, the amount of gradation in the region of the processing object is also determined based on the importance map. In this case, as the importance is higher, the color is darker (verges on black), and the amount of gradation is smaller; conversely, as the importance is lower, the color is lighter (verges on white), and the amount of gradation is greater.

Moreover, the manner of gradating each pixel may be a technique that depends on a distance x from an edge of a region of a processing object (a brushstroke pattern), and is not limited in particular; however, the present embodiment employs a technique, in which the color is lighter as the distance x is increased. More specifically, the present embodiment employs a technique, in which the gray scales of an image (a range of brightness indicating the gray levels) are 256 gray scales, and the color gradation of a pixel of a processing object (brightness indicating the gray levels) is calculated according to Equation (1) as follows.

$$B=(255-L)*(1-\exp(-x*x/f(D+n)))+L \qquad (1)$$

In Equation (1), B represents the color gradation of a pixel of a processing object (brightness indicating the gray levels). L represents a color of the brushstroke pattern applied to the pixel of the processing object (brightness indicating the gray levels regarding the entire region of the processing object). f (D+n) represents an arbitrary function, of which output value is increased in accordance with an input parameter (D+n). D represents an amount of gradation in the brushstroke pattern (the region of the processing object) applied to the pixel of the processing object. n represents an arbitrary integer.

Next, descriptions are provided for the ink-wash-painting-like image generation processing that is executed by the image processing apparatus 1 having such a functional configuration as shown in FIG. 2.

Figure 6:
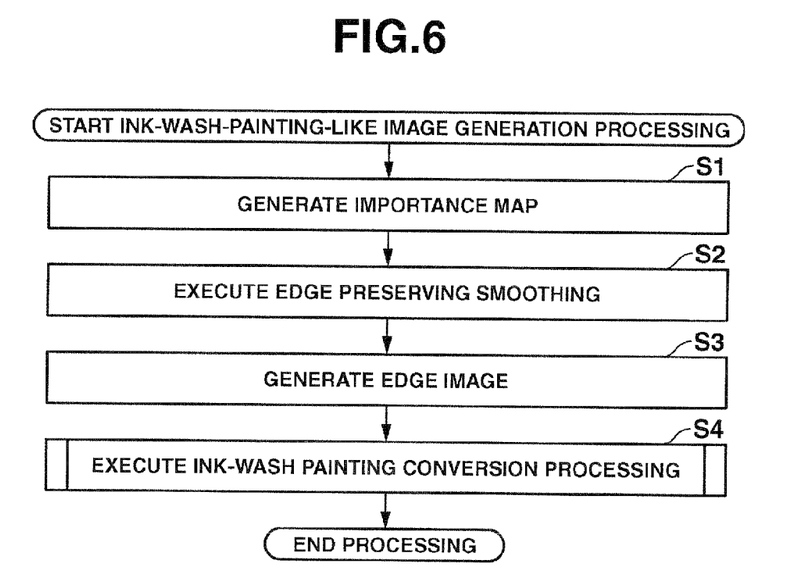
FIG. 6 is a flowchart illustrating a flow of ink-wash-painting-like image generation processing that is executed by the image processing apparatus shown in FIG. 1 having the functional configuration shown in FIG. 2.

FIG. 6 is a flowchart illustrating an example of a flow of the ink-wash-painting-like image generation processing.

When the original image acquisition unit 51 acquires data of an original image, the ink-wash-painting-like image generation processing is initiated, and a series of processing is executed as follows.

In Step S1, the importance detection unit 52 detects importance of each pixel regarding data of an original image, and generates an importance map of spatial distribution for each pixel.

In Step S2, the edge image generation unit 53 executes edge preserving smoothing processing on the data of the original image. The edge preserving smoothing processing refers to image processing, in which noise and fine texture included in the original image are considered to be unnecessary in an ink-wash-painting-like image, and are therefore removed or reduced from an original image, thereby smoothing the original image such that the edge representing the contour of the subject is preserved.

In Step S3, the edge image generation unit 53 generates data of the edge image from the data of the original image, on which the edge preserving smoothing processing in Step S2 was executed.

In Step S4, the ink-wash painting conversion unit 54 converts the data of the edge image into data of an ink-wash-painting-like image by executing the ink-wash painting conversion processing.

As a result, the ink-wash-painting-like image generation processing is completed.

Furthermore, the ink-wash painting conversion processing in Step S4 is hereinafter described in detail.

Figure 7:
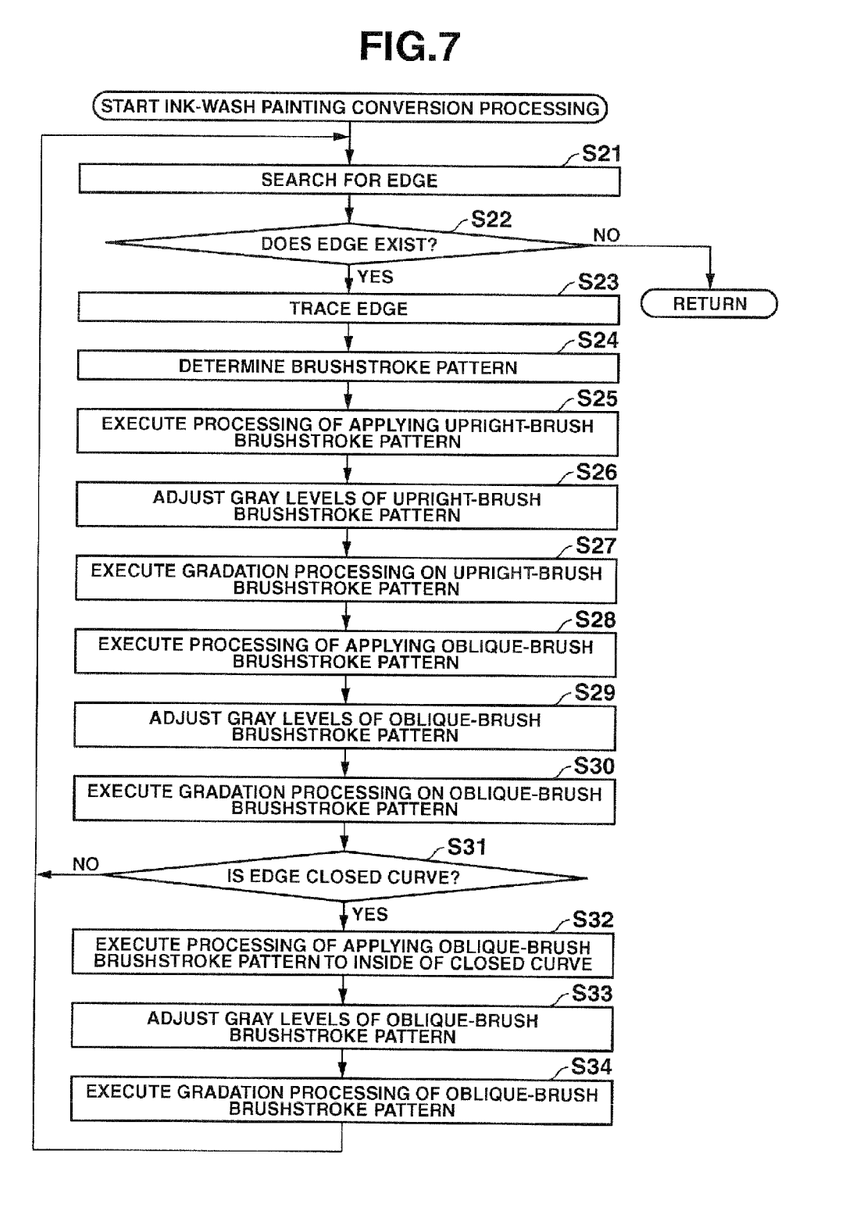
FIG. 7 is a flowchart illustrating a flow of ink-wash painting conversion processing in detail, regarding the ink-wash-painting-like image generation processing in FIG. 6.

FIG. 7 is a flowchart illustrating the ink-wash painting conversion processing in Step S4 in detail regarding the ink-wash-painting-like image generation processing in FIG. 6.

In Step S21, the characteristic region detection unit 61 searches the data of the edge image for an edge.

In Step S22, the characteristic region detection unit 61 determines whether an edge exists, based on a result of processing in Step S21.

In a case in which an edge exists, in Step S23, the characteristic region detection unit 61 traces the edge.

More specifically, the characteristic region detection unit 61 scans the edge image in a so-called raster sequence from the upper left, and searches for pixels belonging to the edge region (Step S21). In a case in which a pixel belonging to such an edge region exists (Step S22: YES), the characteristic region detection unit 61 traces the edge so as to search for other pixels belonging to the edge region (Step S23).

In Step S24, based on the edge region traced in this manner, the brushstroke pattern determination unit 62 determines a brushstroke pattern to be used in subsequent steps, from among brushstroke patterns, of which data is stored in the brushstroke pattern storage unit 71.

More specifically, the brushstroke pattern determination unit 62 determines an upright-brush brushstroke pattern as the brushstroke pattern to be used for the edge region that was traced in the processing in Step S23. Moreover, the brushstroke pattern determination unit 62 determines an oblique-brush brushstroke pattern as the brushstroke pattern to be used for the surrounding region of the edge region. Furthermore, in a case in which the edge region is a region of a closed curve, the brushstroke pattern determination unit 62 determines the oblique-brush brushstroke pattern as the brushstroke pattern to be used for the inside of the closed curve.

In Step S25, the brushstroke pattern conversion unit 63 executes processing of converting the data of the edge region into data of the upright-brush brushstroke pattern, such that the upright-brush brushstroke pattern is applied to the edge region that was traced in the processing in Step S23 (hereinafter referred to as "application processing").

More specifically, since the length of the edge region traced in the processing in Step S23 (the length of a longitudinal curve) is different each time, the brushstroke pattern conversion unit 63 enlarges or reduces the data of the upright-brush brushstroke pattern that is read from the brushstroke pattern storage unit 71, in accordance with the length of the edge region. In addition, the brushstroke pattern conversion unit 63 converts (applies) the data of the edge region into (to) data of the upright-brush brushstroke pattern that was enlarged or reduced.

In Step S26, based on the importance map generated in the processing in Step S1 (FIG. 6), the gray level adjustment unit 64 adjusts the gray levels of the upright-brush brushstroke pattern, on which the application processing was executed in Step S25.

In Step S27, based on the importance map generated in the processing in Step S1 (FIG. 6), the gradation unit 65 executes gradation processing on the upright-brush brushstroke pattern, on which the application processing was executed in Step S25.

In Step S28, the brushstroke pattern conversion unit 63 executes application processing, such that the oblique-brush brushstroke pattern is applied to the surrounding region of the edge region traced in the processing in Step S23.

In Step S29, based on the importance map generated in the processing in Step S1 (FIG. 6), the gray level adjustment unit 64 adjusts the gray levels of the oblique-brush brushstroke pattern, on which the application processing was executed in Step S28.

In Step S30, based on the importance map generated in the processing in Step S1 (FIG. 6), the gradation unit 65 executes gradation processing on the oblique-brush brushstroke pattern, on which the application processing was executed in Step S28.

In Step S31, the brushstroke pattern conversion unit 63 determines whether the edge region traced in the processing in Step S23 is a region of a closed curve.

In a case in which the edge region is not a region of a closed curve, i.e. in a case in which the region is a region with a starting point and an ending point, the determination in Step S31 is NO, the processing returns to Step S21 in which another edge searched, and the processing in and after Step S22 is repeated.

On the other hand, in a case in which the edge region is a region of a closed curve, i.e. in a case in which the region is a region without a starting point and an ending point, the determination in Step S31 is YES, and the processing advances to Step S32.

In Step S32, the brushstroke pattern conversion unit 63 executes application processing, such that the oblique-brush brushstroke pattern is applied to the inside of the closed curve of the edge region traced in the processing in Step S23.

In Step S33, based on the importance map generated in the processing in Step S1 (FIG. 6), the gray level adjustment unit 64 adjusts the gray levels of the oblique-brush brushstroke pattern, on which the application processing was executed in Step S32.

In Step S34, based on the importance map generated in the processing in Step S1 (FIG. 6), the gradation unit 65 executes gradation processing on the oblique-brush brushstroke pattern, on which the application processing was executed in Step S32.

Subsequently, the processing returns to Step S21 in which another edge is searched, and the processing in and after Step S22 is repeated.

In this way, the loop processing in Steps S21 to S34 is repeatedly executed on each edge region included in the edge image. In addition, when the processing on the last edge region is completed, since an edge cannot be searched in the processing in the next Step S21, the determination in the next Step S22 is NO, and the ink-wash-painting-like image generation processing is completed. More specifically, the processing in Step S4 of FIG. 6 is completed, and the entirety of the ink-wash-painting-like image processing is completed.

The image processing apparatus of the present embodiment configured as above includes the original image acquisition unit 51, the characteristic region detection unit 61, the brushstroke pattern determination unit 62, and the brushstroke pattern conversion unit 63.

The original image acquisition unit 51 acquires data of an original image.

The characteristic region detection unit 61 detects a characteristic region (an edge region in the present embodiment) from the data of the original image.

The brushstroke pattern determination unit 62 determines data of a brushstroke pattern to be applied to each of a characteristic region and at least one region identified by the characteristic region (a surrounding region of the edge region, and an inside of a region of a closed curve formed by the edge region, in the present embodiment), from data of at least two brushstroke patterns (an upright-brush brushstroke pattern and an oblique-brush brushstroke pattern in the present embodiment) stored beforehand in the brushstroke pattern storage unit 71.

The brushstroke pattern conversion unit 63 converts data of each of the region of the characteristic region and at least one region identified by the characteristic region, by using the brushstroke pattern thus determined.

In this way, by providing at least two brushstroke patterns, basic brush drawing of ink-wash painting can be faithfully expressed. As a result, it is possible to obtain an image that is more similar to a real ink-wash painting.

The image processing apparatus of the present embodiment further includes the importance detection unit 52 and the gray level adjustment unit 64.

The importance detection unit 52 detects importance of each pixel composing an original image, and generates an importance map indicating distribution of the importance detected for each pixel.

Based on the importance map, the gray level adjustment unit 64 adjusts the gray levels regarding the data of the brushstroke pattern to be applied to each of the characteristic region and at least one region identified by the characteristic region.

By adjusting the gray levels in accordance with the importance in this way, it is possible to appropriately express the gray levels peculiar to ink-wash painting. As a result, it is possible to obtain an image that is further remarkably similar to a real ink-wash painting.

The image processing apparatus of the present embodiment executes gradation processing based on the importance map, in which the data of the brushstroke pattern to be applied to each of the characteristic region and at least one region identified by the characteristic region is a processing object.

By executing the gradation processing in accordance with importance in this way, it is possible to appropriately express a blur of an ink peculiar to ink-wash painting. As a result, it is possible to obtain an image that is further remarkably similar to a real ink-wash painting.

In the image processing apparatus of the present embodiment, the characteristic region detection unit 61 detects an edge region of an original image as a characteristic region, and the brushstroke pattern determination unit 62 determines a first brushstroke pattern (an upright-brush brushstroke pattern in the present embodiment) to be applied to the edge region thus detected, and determines a second brushstroke pattern (an oblique-brush brushstroke pattern in the present embodiment) to be applied to an inside of a closed region in a case in which the edge region and a surrounding region of the edge region form the closed region.

As a result, it is possible to implement image processing that imitates a drawing style peculiar to ink-wash painting such that a contour of an object and its perimeter are distinguishably drawn while altering a region where a writing brush abuts paper. As a result, it is possible to obtain an image that is further remarkably similar to a real ink-wash painting.

It should be noted that the present invention is not limited to the embodiment described above, and any modifications and improvements thereof within the scope that can realize the object of the present invention are included in the present invention.

For example, the aforementioned embodiment employs an edge region as a characteristic region detected from an original image; however, it is not limited thereto in particular, and various diversity of other regions such as, for example, a so-called attention region or focused region may be employed.

For example, regarding a region in which the brushstroke pattern is made different from that in a characteristic region, the aforementioned embodiment employs a surrounding region of an edge region and an inside of a region of a closed curve formed by the edge region; however, it is not limited thereto in particular as long as the region is identified from the characteristic region, and alternatively, for example, a region that is separated from the edge region at a predetermined distance may be employed.

For example, although the aforementioned embodiment employs an upright-brush brushstroke pattern and an oblique-brush brushstroke pattern as brushstroke patterns, the brush patterns are not limited thereto in particular, as long as at least two patterns are provided. For example, several types of patterns with different widths may be employed as the oblique-brush brushstroke pattern. In this case, the upright-brush brushstroke pattern may be applied as a first brushstroke pattern to be applied to the edge region; a first type of the oblique-brush brushstroke pattern may be applied as a second brushstroke pattern to be applied to the closed region in a case in which the edge region is the closed region; and a second type of the oblique-brush brushstroke pattern may be applied as a third brushstroke pattern to be applied to the surrounding region of the edge region. Moreover, the second brushstroke pattern and the third brushstroke pattern may be the same patterns.

For example, although the gray level adjustment and gradation of brushstroke patterns are performed based on importance of an image in the aforementioned embodiment, it is not limited thereto in particular. Alternatively, for example, by creating a background image that imitates a paper medium or a canvas for drawing ink-wash painting, gray level adjustment and gradation of brushstroke patterns may be performed based on a type of the background image (a type corresponding to the quality of material of the paper medium or the canvas).

Moreover, for example, the image processing apparatus of the present invention can be applied to electronic devices in general that can execute the aforementioned image processing. More specifically, for example, the present invention can be applied to a personal computer, a smart phone, a printer, a television, a video camera, a portable navigation device, a cell phone device, a portable game device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the aforementioned functions are not particularly limited to the example in FIG. 2, so long as the image processing apparatus 1 can be provided with the functions enabling the aforementioned processing sequence to be executed as its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable media 31 shown in FIG. 1 distributed separately from the device main body for supplying the program to a user, but can also be constituted by a storage medium or the like supplied to the user in a state incorporated in the device main body in advance. The removable media 31 is composed of a magnetic disk (including a floppy disk), an optical disk, a magnetic optical disk, or the like, for example. The optical disk is composed of a CD-ROM (Compact Disk-Read Only Memory), a DVD (Digital Versatile Disk), or the like, for example. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 19 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the sprits of the present invention. Such embodiments and modifications are included in the scope of the invention and the summary described in the present specification, and are included in the invention recited in the claims as well as the equivalent scope thereof.

What is claimed is:

1. An image processing apparatus, comprising:
an acquisition unit that acquires an original image;
an importance detection unit that detects an importance of each pixel of the original image acquired by the acquisition unit;
an importance map generation unit that generates an importance map indicating a distribution of the importance of each pixel detected by the importance detection unit;
a characteristic region detection unit that detects a characteristic region of the original image, from the original image acquired by the acquisition unit;
a determination unit that determines a brushstroke pattern that should be applied to the characteristic region detected by the characteristic region detection unit, from at least two types of brushstroke patterns stored in a storage unit;
a conversion unit that converts an image in the characteristic region into a brushstroke pattern image, to which the brushstroke pattern is applied, based on the brushstroke pattern determined by the determination unit; and
an adjustment unit that adjusts, based on the importance map, a color of the brushstroke pattern image in the characteristic region such that the color of the brushstroke pattern image is adjusted to be deeper in proportion to a degree of the importance.

2. The image processing apparatus according to claim 1, wherein the adjustment unit adjusts the color of the brushstroke pattern image to be darker in proportion to the degree of the importance.

3. The image processing apparatus according to claim 1, further comprising:
a gradation unit that executes, based on the importance map, gradation processing on the color of the brushstroke pattern image in the characteristic region, and wherein at least one region in the characteristic region is a processing object.

4. The image processing apparatus according to claim 1, wherein the characteristic region detection unit detects an edge region of the original image as the characteristic region, and
wherein, in a case in which the edge region detected by the characteristic region detection unit forms a closed region, the determination unit determines a first brushstroke pattern to be applied to the edge region detected by the characteristic region detection unit, and a second brushstroke pattern to be applied to an inside of the closed region.

5. The image processing apparatus according to claim 4, wherein the determination unit determines a third brushstroke pattern to be applied to a surrounding region of the edge region detected by the characteristic region detection unit.

6. The image processing apparatus according to claim 5, wherein the second brushstroke pattern and the third brushstroke pattern are the same pattern.

7. An image processing method performed by an image processing apparatus to execute image processing on an original image, the method comprising:
  acquiring the original image;
  detecting an importance of each pixel of the acquired original image;
  generating an importance map indicating a distribution of the detected importance of each pixel;
  detecting a characteristic region of the original image;
  determining a brushstroke pattern that should be applied to the detected characteristic region, from at least two types of brushstroke patterns stored in a storage unit;
  converting an image in the characteristic region into a brushstroke pattern image, to which the brushstroke pattern is applied, based on the determined brushstroke pattern;
  adjusting, based on the importance map, a color of the brushstroke pattern image in the characteristic region, such that the color of the brushstroke pattern image is adjusted to be deeper in proportion to a degree of the importance.

8. A non-transitory computer-readable storage medium having stored thereon a program for controlling image processing of an original image, the program being executable by a computer to cause the computer to function as:
  an acquisition unit that acquires the original image;
  an importance detection unit that detects an importance of each pixel of the original image acquired by the acquisition unit;
  an importance map generation unit that generates an importance map indicating a distribution of the importance of each pixel detected by the importance detection unit;
  a characteristic region detection unit that detects a characteristic region of the original image, from the original image acquired by the acquisition unit;
  a determination unit that determines a brushstroke pattern that should be applied to the characteristic region detected by the characteristic region detection unit, from at least two types of brushstroke patterns stored in a storage unit;
  a conversion unit that converts an image in the characteristic region into a brushstroke pattern image, to which the brushstroke pattern is applied, based on the brushstroke pattern determined by the determination unit; and
  an adjustment unit that adjusts, based on the importance map, a color of the brushstroke pattern image in the characteristic region, such that the color of the brushstroke pattern image is adjusted to be deeper in proportion to a degree of the importance.

* * * * *